Oct. 12, 1937.  E. T. HERMANN  2,095,252
PERVIOUS BODY FOR ACOUSTIC OR OTHER PURPOSES
Original Filed April 6, 1931
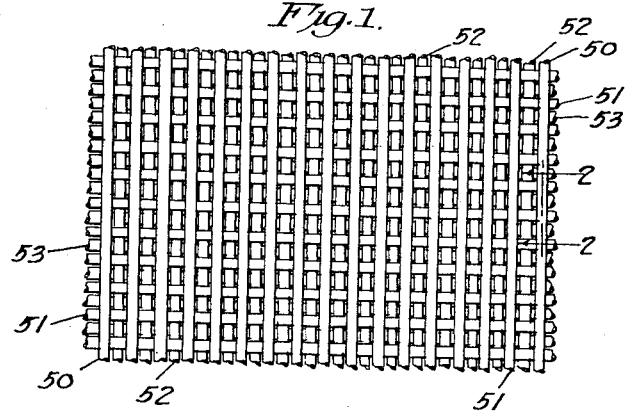
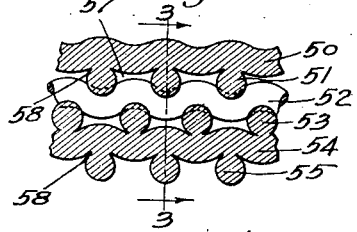
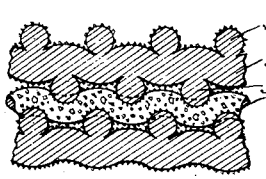
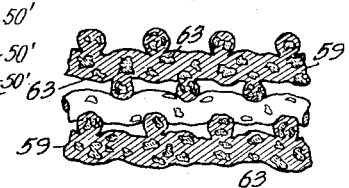
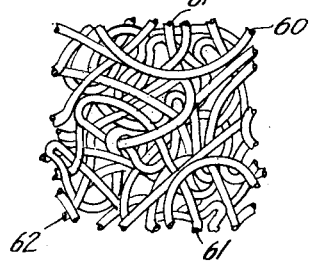
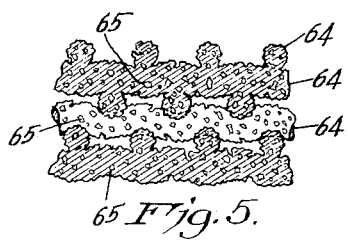
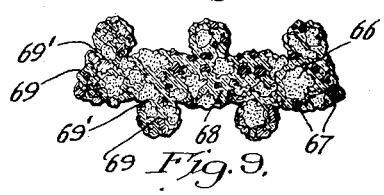
INVENTOR.
Earnest T. Hermann
BY Arthur P. Knight and
Alfred W. Knight
ATTORNEYS.

Patented Oct. 12, 1937

2,095,252

UNITED STATES PATENT OFFICE 2,095,252

PERVIOUS BODY FOR ACOUSTIC OR OTHER PURPOSES

Earnest T. Hermann, El Segundo, Calif.

Application April 6, 1931, Serial No. 528,224
Renewed January 15, 1937

3 Claims. (Cl. 72—37)

The principal object of my invention is to provide a filamentous fluid pervious body having a high percentage of mutually intercommunicating voids therewithin open to free communication with the medium surrounding said body at the surface of said body, composed of intermingled and supportingly interbonded elongated particles or filamentary strands of body material, for example heat-bonded argillaceous or self-bonded cementitious material, for use in industry and the arts as an acoustic material of particularly high sound absorbing characteristics or as a matrix for the support of catalytic agents, contact materials or the like, or for other purposes for which the structure of such a body renders it suitable.

In order to avoid, as much as possible, a duplication of description in this application, I have confined the description of the various bodies and method of manufacture thereof to the preparation of a filamentous fluid pervious class of bodies for use as an acoustic material. In this regard I have described the internal surfaces of my bodies as "reflecting surfaces" which, in the case of the use of said bodies as a matrix for the support of catalytic agents and the like, serve merely as contact surfaces. The various disclosures herein regarding the provision of such surfaces pertain to the construction of a body of the type and form described, and are not limited to the construction of a body designed to be used for acoustic purposes.

The material may be used as a lining for lecture chambers, auditoriums and the like, wherein the material, due to the very limited plane reflecting area at the surface face thereof, reflects a very small percentage of incident sound, and, due to the large number of mutually intercommunicating voids therein, permits penetration of sound to within said material whereupon the successive reflection of said sound by the multiplicity of reflection surfaces offered by the filamentous body obtains a complete or substantially complete absorption of said sound.

A further object of my invention is to provide a filamentous body composed of strands or filamentary particles which may be placed in symmetric geometric relative arrangement whereby the absorption of sound may be facilitated by the provision of intercommunicating voids of predeterminable size and shape within such a body.

The filamentous fluid pervious body of my invention may be produced by the extrusion of a plastic mass of suitable consistency through a die into a mold or other suitable receptacle in such a manner as to form a body composed of filaments or strands as above described in which the strands or filaments are intermingled and supportingly contacting one another at points distributed throughout said body, while leaving intercommunicating voids therebetween, and then causing the filaments to set or harden so as to impart the desired strength to the individual filaments and also bond the same firmly together to form an integral body of high mechanical strength and containing a high percentage of intercommunicating voids as shown in some of the accompanying illustrations. The filaments may also be formed by shaving same off a block of plastic material, arranging same in any desired manner and then causing them to interbond, as hereinafter described. These strands or filaments may also be provided, if desired, with additional external reflecting surfaces, as for example by coating said strands with a granular or crystalline material after the formation thereof and before or after the assembly thereof into a filamentous body, or said strands or filaments may be provided with internal voids or passages formed in the individual strands or filaments themselves, as hereinafter described. These strands or filaments are preferably also of rather small thickness, for example, of a thickness on the order of 1 to 2 mm.

An acoustic body formed as a filamentous fluid pervious body according to my invention, possesses, when provided with filaments having additional external reflecting surfaces or interior voids and passages which are intercommunicatingly open to the surface of said filaments as above described, very high sound absorption characteristics by virtue of the combination of a multiplicity of mutually intercommunicating voids open to free communication with the medium surrounding said body with the multiplicity of secondary reflecting surfaces offered by the filaments themselves. This is due to the fact that the voids between the filaments permit the sound waves to enter the body freely and the smaller, more numerous, surfaces comprised by the externally attached granular material or the internally formed voids of the filaments occasion, in a broad sense, an infinitude of successive reflections of said sound waves with attendant absorption thereof. In this manner, only a very small amount of the original wave front striking the body is reflected back into the medium adjacent said body.

It is well known that the absorption of sound by a reflecting surface is dependent upon the ability of that surface to convert, by being set into motion, a portion of the incident sound energy into heat. When an acoustic body is composed of a material high in intrinsic sound absorptivity there are necessary but a few successive reflections of a sound wave in order to reduce the intensity of that wave to a desirable minimum, however, when an acoustic body is composed of a material low in intrinsic sound absorptivity there must be, necessarily, a great number of successive reflections of a sound wave in order to sufficiently absorb said wave. A body constructed according to my invention will offer, even though fabricated of a material low in intrinsic sound absorptivity, very high total absorption due to the fact that the body is pervious to the medium which carries the sound waves, permitting the admittance of said waves to the interior of the body, accompanied by a progressive reflection of said waves by the filamentary strands of body material.

The accompanying drawing illustrates embodiments of my invention and referring thereto:

Fig. 1 is a face view of one type of filamentous fluid pervious body of my invention.

Fig. 2 is a section of same along line 2—2 in Fig. 1.

Fig. 3 is a section of same along line 3—3 in Fig. 2, showing filaments provided with additional reflecting surfaces according to one form of my invention.

Fig. 4 is a view corresponding to that shown in Fig. 3, showing incorporation of relatively large aggregate particles in the filaments.

Fig. 5 is a view corresponding to that shown in Figs. 3 and 4, showing the incorporation of intercommunicating voids within the filaments of body material.

Fig. 6 is a face view of an alternative form of fluid pervious filamentous body according to my invention.

Fig. 7 is a transverse section thereof.

Fig. 8 is a transverse section of another alternative form of fluid pervious body according to my invention, in which the size of the filaments has been varied to produce a body which presents a large variation in the dimensions of the intercommunicating voids.

Fig. 9 is a sectional view of an alternative form of extruded filament forming a fluid pervious body, according to my invention.

Fig. 10 is a sectional view of a form of filamentous fluid pervious body which may be produced by shaving filaments from a block of plastic material.

Referring now to the drawing showing certain examples of fluid pervious bodies according to this invention, in Figs. 1 and 2 I have indicated the face layer of filaments by the numeral 50 (top layer in Fig. 2), a second layer 51 with filaments substantially at right angles to the filaments in layer 50, a third layer 52 having filaments substantially parallel to and staggered in respect to those in layer 50 and substantially at right angles to those in layer 51, a fourth layer 53 having filaments substantially parallel to and staggered in respect to those in layer 51 and substantially at right angles to those in layer 52. In Fig. 2 I have indicated two additional layers 54 and 55 corresponding to the layers 50 and 51 in their relative arrangement. Said layers 54 and 55 represent a partial repetition of the layer arrangement from 50 to 53 as shown, it being understood that this arrangement may be repeated as desired in order to build up a body of sufficient thickness for a particular purpose. This regular relative arrangement of the filaments provides for the production of voids which are mutually intercommunicating and of uniform size and shape, as shown at 57. The various layers of filaments are bonded together at the contact points of the filaments, indicated at 58, in a manner hereinafter described.

A body of the above general type wherein, however, the filaments were spaced at slightly greater relative intervals than shown in Figs. 1 and 2, was prepared in which the average diameter of the strands was approximately 1.75 mm. and such body was found to contain in excess of 78% total voids.

A body of this type may be manufactured by extruding a layer of filaments into a receptacle as the receptacle is moved across beneath an extrusion nozzle in a direction perpendicular to the row of openings in said nozzle, then turning said receptacle at right angles to its former position and extruding a layer of filaments on top of the first layer, building up, by several repetitions of this process, a filamentous body as above described.

The material as laid should be of such consistency as to cause the strands to stick or adhere to one another and to substantially retain their shape and spacing, so as to preserve the intended structure until the setting of the material is completed. The filaments of the bodies shown in Figs. 2, 3, 4 and 5 are shown as slightly sagging. This sagging of the filaments is for the purpose of decreasing the void volume, and increasing the mechanical strength of the body and the surface area thereof in a given volume, and may be accomplished by extruding the filaments in a highly plastic condition and allowing them to sag of their own weight or by extruding the filaments in a less plastic state and then compressing the built-up body to the desired extent.

The filamentary strands of which the fluid pervious body of my invention is composed may be of ceramic, cementitious or other material such as hereinafter described. A plastic mass of the material is prepared and extruded as above described to form and place the filaments in above relationship and then caused to set in a manner dependent upon the material used, as hereinafter described.

The above described body of filaments in regular relative arrangement may also be made of filaments produced by the shaving method, hereinafter described, as by providing guide means for the filaments coming from the shaving blade to arrange said filaments in desired interrelation.

Bodies of the type shown in Figs. 6 and 7 consist of strands laid in an irregular manner, wherein the strands follow no preconceived pattern but are intermingled and intersupporting, as shown. Referring to Fig. 6, numerals 60, 61 and 62 indicate a few strands of the body, which are seen to be placed in very haphazard interrelation. Bodies of this type may, if desired, be made by extrusion of a single strand of plastic material through a suitable opening. Such a strand may be caused to accumulate and build up in irregular manner in any suitable mold or receptacle to form a body of the desired shape and size. Such bodies may be formed more advantageously, however, by extruding a plurality of strands simultaneously through a suitable extrusion die having a plurality of openings, into a suitable receptacle, filling the receptacle to a suitable depth, allowing the filaments or strands to dry or set, and thereupon removing the body from the receptacle. A body of this type was prepared using a device of the type described having extrusion openings of approximately 0.65 mm. diameter, which, after bonding consisted of approximately 62% voids. A body prepared in this manner and having a total volume of 144 cu. in. (a block 1 foot square and 1 inch thick) was also found, by actual experiment to contain a total surface area of 73 sq. ft. available for sound absorption or other purposes, this being the total surface area open to access from the surrounding fluid medium.

Another body, similar to the above, extruded from a device similar to that above described with the exception that the extrusion die was provided with openings of approximately 1.75 mm. diameter, was found to consist of approximately 74% voids. It will be apparent that the voids in any of the above bodies are all available for the reception and transmission of sound waves throughout the body due to the mutual intercommunication thereof and to their being open to the surrounding atmosphere at the exposed boundaries of the body.

Another type of body is shown in Fig. 8 as having filaments 60', 61', 62', of different sizes, providing much greater variation of size of the intercommunicating voids therein, due to the variation in the size of the extruded filaments forming said voids. Such bodies may be formed by extruding a plurality of filaments through an extrusion die provided with a plurality of openings, said openings being arranged in groups of different sizes. The openings may be of circular cross section or of any other desired cross section without departing from the spirit of this invention.

Fig. 10 illustrates a form of filamentous fluid pervious body according to my invention which is produced by shaving filaments, of any desired shape, from a block of plastic material, molding or forming same into a body of desired shape and thickness and then causing same to bond. Such filaments may be produced by drawing or scraping a suitable blade provided with suitable projecting cutting teeth, across the face of a block of plastic material, such as a stiff clay or cementitious mixture which is still somewhat plastic, in such a manner as to remove by successive operations filaments whose cross-sectional shape correspond to the shape of the cutting teeth employed. Filament strands produced in this manner possess a very irregular surface structure due to the partial tearing and partial cutting action of the shaving blade, such surface irregularities may be described as minute exfoliations of the material, providing small projecting surfaces and adjacent penetrating fissures or cavities, which, when such filaments are incorporated in an acoustic body assist in the absorption of sound. The filaments may be sprayed with an aqueous medium, preferably a thin aqueous suspension of bonding material of a similar nature to the material used in forming the filaments, for example argillaceous or cementitious material, in order to soften the same and promote plastic bond between the filaments to facilitate molding thereof into a filamentous body which is subsequently caused to be permanently bonded. In this operation, the thin edge portions of the filaments as shown at 72' are momentarily rendered quite plastic by absorption of the aqueous medium. These thin edge portions are thus made sufficiently wet and plastic, at the instant when the filaments are brought into contact with one another, to literally flow together, so that plastic inter-bonding of the filaments is obtained, while the heavier section of the filaments will not become plastic to any appreciable depth, thus preserving the strength of the filaments to a great degree, prevent sagging of the moulded body.

The above described method of producing filaments is quite effective when a combustible material has been incorporated in a clay mixture, in which case the filaments are cut off the block of material without coating the combustible constituents with a layer of clay as sometimes occurs in the extrusion of such a mixture, which permits easy escape of the products of combustion of said constituents during the firing of the assembled body, leaving internal voids in communication with the surface.

In Fig. 3 I have shown a section of a body, formed in a manner similar to that employed in the formation of the body shown in Figs. 1 and 2, wherein the filaments 50' are coated with a granular or crystalline material for the purpose of increasing the number and area of reflecting surfaces at the periphery of the filaments. This type of body may be formed by exposing the filaments to a blast of air containing an appreciable amount of fine granular or crystalline material in suspension, as the filaments are extruded from the foraminous nozzle. The plastic filaments permit the particles of material to partially embed themselves therein which, upon the setting or bonding of the filaments, become thoroughly incorporated therewith. By this means it is possible to greatly increase the surface reflecting area of the filaments, providing a body of particularly high sound absorption.

Filaments produced by the shaving method may also be coated with fine granular or crystalline material in a suitable manner as by dusting such material thereupon.

In forming ceramic bodies of any of the above types, a plastic mass of argillaceous material and water is prepared, subjected to extrusion in such manner as to form a filamentous body such as above described, dried, and fired at suitable temperature. For example an air floated (90% through 200 mesh screen) mixture of five different clays, having the following analysis:

|  | Per cent (ignited basis) |
|---|---|
| $SiO_2$ | 68.34 |
| $Fe_2O_3$ | 2.35 |
| $Al_2O_2$ | 26.15 |
| Lime (CaO) | 1.08 |
| MgO | .55 |
| Alkali | 1.69 |
| Total | 100.16 |
| Ignition loss | 2.80 | is mixed with one third its weight of water until the mass is quite smooth and uniform and extruded with the use of such apparatus and in such a manner as to produce a body with the desired arrangement of filaments, allowed to air dry and harden, and fired at the proper temperature (Cone #9, 2390° F.) for a sufficient time to accomplish the desired bonding by partial vitrification of the material, whereupon the body is allowed to cool.

I have found that in the case of some certain clays it is desirable to increase the water content of the plastic mass to an amount somewhat greater than shown above in order to facilitate the extrusion thereof into filaments. When the water content is thus raised to a point where the extruded filaments no longer have a definite tendency to maintain their shape they may be partially dried and shrunk after the extrusion thereof and before the molding thereof. This may be accomplished by exposing the filaments to a blast of warm air as they are extruded from an extrusion die or nozzle. The strength of the filaments may be increased to such an extent by this drying and shrinking treatment that they may substantially retain their shape and relative position upon molding. This procedure is quite advantageous in case it is desired to extrude particularly fine filaments. The forming of very small holes in a die is in itself an expensive procedure and due to their small size they are easily clogged with the material being extruded. In the employment of the above procedure, the filaments may be extruded in a semi-liquid state from a horizontal die through somewhat enlarged holes whose axes are vertical whereupon the filaments attenuate to some degree in hanging from the die and are further diminished in size by the loss of water from the clay through evaporation provided by the stream of hot dry air. This permits of forming filaments of smaller diameter than is possible by the direct extrusion process.

It will be understood that when drying the filaments in this manner, care is taken to avoid drying said filaments to such a degree that the material no longer possesses the essential tacky surface consistency by virtue of which the strands or filaments are enabled to interbond at their points of contact.

A relatively coarsely crushed pre-fired clay body, refractory material or the like may be added to the above described plastic clay mass and extruded into filaments, molded, dried and fired as above in which case the ceramic material will shrink upon firing and the refractory material will substantially maintain its volume, which shrinking of the ceramic material around the non-shrinking refractory will cause an irregular shrinking of the filaments and produce a marked surface irregularity thereon, materially contributing to the acoustic properties of a body formed of such filaments. Such a body is illustrated in Fig. 4, wherein the filaments 59 are shown with the refractory material 63 incorporated therein. Filaments of this type may also be formed by the shaving process by the incorporation of refractory material in the plastic block of material from which the filaments are shaved.

A relatively finely divided combustible material such as carbon, coke or wood particles, may be incorporated in the plastic ceramic mass before the formation thereof, into filaments which, upon the firing of the moulded body, will be removed from the ceramic material, leaving voids therein which materially contribute to the acoustic properties of a body produced in this manner. A cross-section of a body of material formed in this manner is shown in Fig. 5, in which 64 represents the filaments formed of ceramic material and 65 represents the internal voids formed within such filaments.

A powdered metallic oxide such as $Fe_2O_3$ may be mixed with the combustible material which will provide oxygen for the combustion of said material with the production of carbon monoxide and carbon dioxide, which gases will, in forcing exit from the filaments, expand and open the voids into one another and to the surface of said filaments. This process, due to the "bloating" of the filaments, produces a product of lower apparent specific gravity and having a considerable amount of exposed reflecting surfaces interiorly of the strands, which in some cases is particularly desirable.

The filamentous fluid pervious body of my invention may also be prepared with a cementitious material, such as oxychloride cements, Portland cement or gypsum cement, in which case a plastic mass thereof is prepared with water or suitable liquid, subjected to extrusion or to a shaving or other suitable operation in such a manner as to form a filamentous body such as above described, and then dried or allowed to set in a manner suitable to the material in use. A portion of such a body is illustrated in section in Fig. 9, wherein numeral 66 represents pumice grains, 67 silica grains and 68 the bonding cement, the filaments 69 being bonded at their points of contact as at 69'. For example a mixture of pumice, silica, magnesite and magnesium chloride, was prepared as follows:

|  |  | Parts by weight |
|---|---|---|
| "A" mixture | Magnesite | 15 |
|  | Silica (30 mesh) | 100 |
|  | Silica (100 mesh) | 25 |
| "B" mixture | Pumice (−14+20 mesh) | 10 |
|  | "A" mixture | 10 |
|  | Magnesite | 3 |
| "C" mixture | $MgCl_2$ sol. 26° Bé | 6 |
|  | "B" mixture | 23 |

The above "C" mixture was thoroughly mixed and extruded with the use of such apparatus and in such a manner as to produce a body with the desired arrangement of filaments, and allowed to set and bond, whereupon the material was air-dried and was ready for use as an acoustic material.

The above mixture was but one of many such mixtures used in the production of examples of my filamentous bodies and it will be understood that there may be innumerable formulae developed which are suitable for manufacture of the above described filamentous fluid pervious bodies. I specifically illustrate the above type of cementitious material for the reason that this type is particularly adapted to my use, inasmuch as the bonding action of the oxychloride cement is communicated to the individual filaments after extrusion thereof whereby the filaments interbond with each other upon static contact and produce, in effect, a homogeneous body after such bonding.

Filaments produced from a cementitious mixture may be made to have a very rough surface texture, whether formed by extrusion or by means of the shaving operation above described. The surface texture of the cementitious filaments is dependent upon the consistency and composition of the plastic material and may be varied by control of the proportions of aggregate material, cement, and aqueous medium employed.

The cementitious material from which the filaments are prepared may be provided with internal voids by the addition of a gas-forming material such as calcium carbide ($CaC_2$) to the mixture which, in contact with water, decomposes to $C_2H_2$ which will form gaseous voids within the material. The size of these voids may be regulated by the selection of the proper size of calcium carbide particle and degree of mixing of the mixture. This method of producing voids in a cementitious mixture is quite successful in the case where a Portland cement is used in the preparation of the filaments. When a plastic block of cementitious material for use in the shaving method of producing filaments is prepared with the addition of such a gas-forming material, filaments subsequently prepared from such a block will contain the provided voids, some of them substantially within the filaments but communicating with the surface thereof, and some of them providing surface irregularities to the filaments.

I claim:

1. A filamentous fluid pervious body comprising intercommunicating supportingly interbonded elongated strands of ceramic material providing a high percentage of mutually intercommunicating voids therebetween in communication with the surface of said body and a multiplicity of internal surfaces defining said voids, said strands being provided with additional external surfaces by means of thereto bonded peripherally projecting granular particles.

2. A filamentous fluid pervious body comprising intercommunicating supportingly interbonded elongated strands of ceramic material providing a high percentage of mutually intercommunicating voids therebetween in communication with the surface of said body and a multiplicity of internal surfaces defining said voids, said elongated strands having incorporated therewithin relatively coarse particles of refractory material.

3. An integral body formed of a plurality of intercontacting supportingly interbonded elongated strands formed of inorganic material selected from the group consisting of ceramic and cementitious materials, providing a high percentage of mutually intercommunicating voids therebetween, said elongated strands having a cross-sectional configuration characterized by at least a portion thereof tapering to a relatively thin edge portion, and said strands being interbonded at said relatively thin edge portions.

EARNEST T. HERMANN.